(12) United States Patent
Schleifer et al.

(10) Patent No.: US 8,018,353 B2
(45) Date of Patent: Sep. 13, 2011

(54) METHOD AND APPARATUS FOR ZONE SELECTION IN AREA MONITORING DEVICES

(75) Inventors: Fred Schleifer, Prior Lake, MN (US); Christopher Alan Dums, Neenah, WI (US); Alejandro Ruiz Sanchez, Newark, CA (US); John Drinkard, Foster City, CA (US)

(73) Assignee: Omron Scientic Technologies, Inc., Fremont, CA (US)

( * ) Notice: Subject to any disclaimer, the term of this patent is extended or adjusted under 35 U.S.C. 154(b) by 334 days.

(21) Appl. No.: 12/436,959

(22) Filed: May 7, 2009

(65) Prior Publication Data

US 2009/0322549 A1    Dec. 31, 2009

Related U.S. Application Data

(60) Provisional application No. 61/051,938, filed on May 9, 2008.

(51) Int. Cl.
*G08G 1/017* (2006.01)

(52) U.S. Cl. .................. 340/937; 340/903; 340/435

(58) Field of Classification Search ............. 340/435, 340/436, 517, 522, 903, 932.2, 933, 937; 375/240.14, 240.16; 382/275; 348/333.11, 348/143; 111/200
See application file for complete search history.

(56) References Cited

U.S. PATENT DOCUMENTS

| | | | |
|---|---|---|---|
| 6,301,301 B1 * | 10/2001 | Isu et al. | 375/240.14 |
| 6,698,368 B2 * | 3/2004 | Cresswell | 111/200 |
| 7,577,199 B1 * | 8/2009 | Herz | 375/240.16 |
| 2006/0274056 A1 | 12/2006 | Saravanan et al. | |
| 2007/0194944 A1 | 8/2007 | Galera et al. | |
| 2009/0160996 A1 * | 6/2009 | Yamaoka et al. | 348/333.11 |
| 2009/0202170 A1 * | 8/2009 | Weiss | 382/275 |

FOREIGN PATENT DOCUMENTS

EP    0997859 A2    5/2000

* cited by examiner

*Primary Examiner* — Van T. Trieu
(74) *Attorney, Agent, or Firm* — Coats & Bennett, P.L.L.C.

(57) ABSTRACT

Zone selection logic in an area monitoring device increases the number of unique monitoring zone selections that can be selected using a limited number of discrete zone selection inputs, without compromising the safety critical operation of zone selection. The device monitors the logical state of each input in a set of individual inputs and recognizes each unique logical combination of zone selection inputs as a different zone selection. For example, each of two or more configured monitoring zones is associated with a different combinatorial zone selection pattern of asserted zone selection input signals. Correspondingly, a control circuit within the area monitoring device is configured to monitor the discrete zone selection inputs and activate a given one of the configured monitoring zones based on recognizing the associated combinatorial zone selection pattern of asserted zone selection signals.

20 Claims, 3 Drawing Sheets

| | Number of Total Used Inputs ($n$) | | | |
|---|---|---|---|---|
| Number of Asserted Inputs ($r$) | 5 | 4 | 3 | 2 |
| 1 | 5 | 4 | 3 | 2 |
| 2 | 10 | 6 | 3 | |
| 3 | 10 | 4 | | |
| 4 | 5 | | | |

Max. number of zones = $\dfrac{n!}{r!*(n-r)!}$

*FIG. 2*

METHOD AND APPARATUS FOR ZONE SELECTION IN AREA MONITORING DEVICES

RELATED APPLICATIONS

This application claims priority under 35 U.S.C. §119 from the U.S. provisional patent application filed on 9 May 2008 and identified by Ser. No. 61/051,938, which is incorporated herein in its entirety.

FIELD OF THE INVENTION

The present invention generally relates to area monitoring devices, such as laser scanners or other optoelectronic monitoring systems, and particularly relates to zone selection in such devices.

BACKGROUND

Area monitoring devices, such as laser scanners, and other optoelectronic monitoring systems, provide control and safety functions in a wide variety of applications. Laser scanners, for example, are used in fixed installations to safeguard hazardous machine areas, and for collision avoidance in autonomous guided vehicle (AGV) installations.

A typical laser scanner provides control signaling responsive to detecting object intrusions into its monitored "zone." For example, the laser scanner may include safety-critical output switches that open electrical power to a hazardous machine, responsive to detecting object intrusions. In AGV applications, the laser scanner may activate vehicle braking systems, initiate evasive steering actions, or otherwise inhibit AGV movement, responsive to detecting objects within safety-critical distances of the AGV.

In one aspect of such monitoring, zone monitoring characteristics may need to change dynamically. For example, in a machine guarding application, the laser scanner may be required to monitor a first zone during one phase of machine operation, and monitor a second zone during another phase of machine operation. The physical areas covered by each zone may be the same or at least overlap, but different monitoring parameters may be used, such as different warning and safety-critical distances or different zone boundaries. Similarly, in AGV applications, different zones may be required depending on the AGV's context.

AGV context may be defined, for example, based on one or more detected potential obstacles around the AGV, AGV speed, and AGV location. For example, a large factory environment may include open areas or areas with no human workers, where high AGV speed is permitted, and other areas with potential obstacles or with human workers, where lower AGV speed is mandated. Different monitoring zone configurations are necessary for proper, safe AGV operation in these differing contexts.

Correspondingly, it is known for AGV vehicles to provide dynamically changing zone selection inputs to a laser scanner, to cause the laser scanner to change its monitoring zone during the course of normal operation. Similarly, machine control systems also may provide zone selection inputs to a laser scanner, so that the laser scanner's monitoring zone may be changed over changing phases of machine operation.

As zone selection has critical safety implications, the zone selection inputs of a laser scanner generally include multiple safety-of-design considerations. For example, the use of complementary discrete electrical inputs may be used for zone selection. In this case, the laser scanner may be configured to require inputs—one HIGH and one LOW—before activating a corresponding given monitoring zone. As a result, single fault conditions involving disconnected or shorted inputs may be easily detected and mitigated.

The use of discrete inputs and the requirement for complementary input assertion enhances system safety by eliminating or at least greatly reducing incorrect or inadvertent zone selection. One disadvantage, however, is that there are significant limitations on the number of zones that can be safely selected for a given number of discrete inputs.

SUMMARY

Zone selection logic in an area monitoring device increases the number of unique monitoring zone selections that can be selected using a set of discrete zone selection inputs, without compromising the safety critical operation of zone selection. The device monitors the logical state of each input in a set of individual inputs and recognizes each unique logical combination of zone selection inputs as a different zone selection. For example, each of two or more configured monitoring zones is associated with a different combinatorial zone selection pattern of asserted zone selection input signals. Correspondingly, a control circuit within the area monitoring device is configured to monitor the discrete zone selection inputs and activate a given one of the configured monitoring zones based on recognizing the associated combinatorial zone selection pattern of asserted zone selection signals.

In at least one embodiment, for the case where there are a total of m discrete zone selection inputs provided by the device, and a number n of them are configured for use in zone selection, then the number of unique zone selection combinations recognizable by the device is given by the binomial coefficient $$\binom{n}{r} = \frac{n!}{r!(n-r)!},$$

where ! represents the factorial operator, e.g., $5!=5\cdot4\cdot3\cdot2\cdot1$, and where r represents the number of active zone selection input signals that are asserted. "Asserted" connotes a zone select input whose zone select input signal line is logically asserted.

The value of n may simply equal the value of m, i.e., all of the available inputs are used for zone selection. However, in at least one embodiment, the value of n is configurable and may be set to a value less than m, meaning that only a subset of the m zone selection inputs are actively monitored for zone selection.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a table illustrating combinatorial zone selection patterns as advantageously recognized by an area monitoring device, according to the teachings herein.

DETAILED DESCRIPTION

Figure 1:
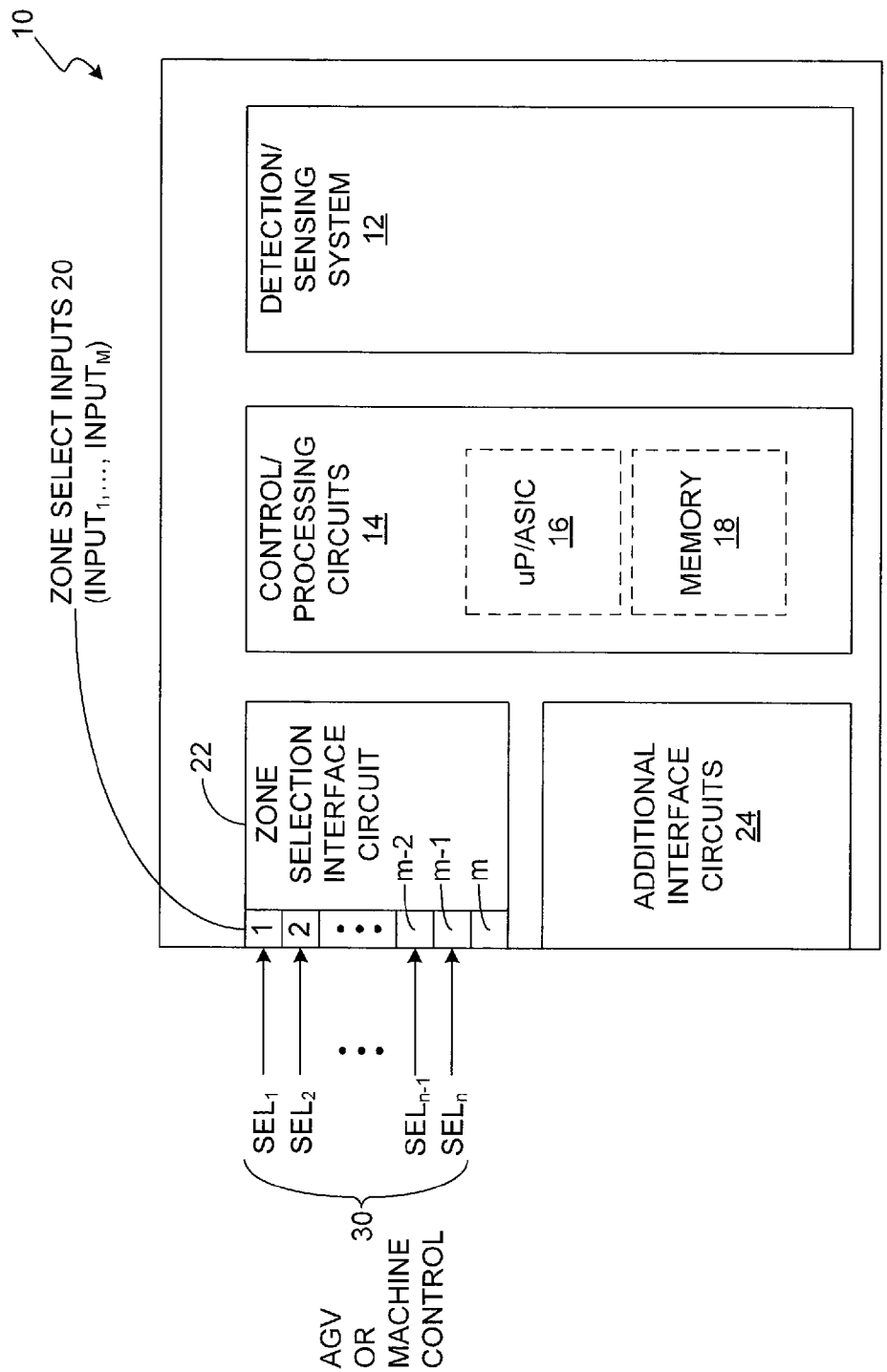
FIG. 1 is a block diagram of one embodiment of an area monitoring device that implements a monitoring zone selection method and apparatus as taught herein.

By way of non-limiting example, FIG. 1 illustrates a device 10 that includes a detection/sensing system 12, control/processing circuits 14, including one or more microprocessors or ASICs/FPGAs 16, and associated operating, program, and configuration memory 18. The illustrated device 10 further includes a plurality of discrete zone selection inputs 20 (INPUT$_1$ ... INPUT$_m$) and an associated zone selection interface circuit 22, along with one or more additional interface circuits 24.

As part of installation, the device user connects individual zone select signal lines 30 (SEL$_1$ ... SEL$_n$) to respective ones of the zone select inputs 20. The number n of discrete signal lines 30 connected to the device 10 may be less than the total number m of zone select inputs 20 provided by the device 10. In such cases, the device 10 is configured to monitor only the n zone select signal lines for valid zone selection inputs. The device 10 still may monitor the unused m-n zone selection lines for fault conditions or unexpected input signal activity, which may indicate wiring or configuration errors.

The discrete zone select signal lines 30 may be controlled by an external system to take on one of two logical states during operation. For example, the device 10 may be mounted to or otherwise associated with a hazardous machine to be safeguarded, or mounted to an AGV for guidance/collision avoidance. The zone select signal lines thus may be driven above (or below) a first voltage threshold to indicate an "asserted" condition, and driven below (or above) a second voltage threshold to indicate a "de-asserted" condition. Alternative schemes may be used. For example, an electrical "open" or non-energized condition on a signal line may be recognized as de-asserted, and an energized condition recognized as asserted. In one embodiment, open=de-asserted and at or about 24 VDC=asserted.

In any case, the device 10 implements an advantageous zone selection detection method that allows it to safely and reliably recognize a comparatively large number of unique monitoring zone selections from a limited number of zone selection inputs. In at least one embodiment, the control/processing circuits 14 are configured to recognize unique combinations of zone selection inputs. For example, if there are a total of n discrete zone selection inputs being monitored by the device 10 for zone selection inputs, and if the external machine or system controlling the zone selection input signals 30 asserts r of them at a time to indicate a particular zone selection, then the number of unique zone selection combinations recognizable by the device 10 is given by the binomial coefficient $$\binom{n}{r} = \frac{n!}{r!(n-r)!}.$$

Again, ! represents the factorial operator, e.g., 5!=5·4·3·2·1, n represents the number of zone selection inputs 20 that are active for zone selection, and r represents the number of those zone selection inputs that are simultaneously asserted to indicate a desired zone selection combination. As noted, n≤m, and r<n. (In at least one embodiment, r preferably is in the range 1≤r≤n−1.)

Thus, the device 10 provides a total number m of discrete zone selection inputs 20, and it may be configured by the device owner or operator to consider a number n of those inputs as being used for a given installation. The number n may be less than or equal to the number m, i.e., the device operator may decide not to use all m zone selection inputs 20 for a given installation. With n used zone selection inputs, the control/processing circuits 14 of the device 10 are configured to detect unique combinations of asserted/de-asserted zone selection signal lines 30.

As a specific example, the device 10 provides the zone selection inputs 20 and associated zone selection interface circuit 22 as an input-only interface. (The zone selection interface circuit 22 may include ESD protection circuits, level-shifting circuits, etc., but in at least one embodiment, it operates to provide a logic signal for every zone selection input 20, such that a microprocessor or other digital processing circuit can evaluate the input states of the zone selection input signals 30, as applied to respective ones of the zone select inputs 20.)

Assuming that the device 10 is configured to use five zone selection inputs 20 for monitoring zone selection, the external device or system asserts a given one of the zone select input signals 30 by connecting it to 24V, and de-asserts the signal line by leaving it open electrically, or connecting it to signal ground. A typical connection for an active input would be to connect it selectively to 24V (or some other defined voltage level) via a relay or other switching device.

In general, the number of unique active combinations available depends on the number n of active inputs, and the number r of the n active inputs that are simultaneously asserted for zone selection. The table depicted in FIG. 2, shows the maximum number of zone sets possible for example values of n and r.

However, it is not necessary to have a zone assigned to every possible combination. Unassigned combinations may be assumed to be invalid. With this logical selection method, the device 10 offers a potentially large set of monitoring zone configurations to select from, while requiring fewer zone select inputs than would be required with non-combinatorial logical detection.

In more detail, the device 10 is configured to receive monitoring zone configuration information. A different set of monitoring parameters may be loaded or otherwise stored in the device, each parameter set defining a different monitoring zone that can be individually selected via the zone selection inputs 20. In that regard, each configured monitoring zone is associated with a different logical combination of r of n asserted zone selection input signals. Activating a given monitoring zone in the device 10 is achieved by asserting r of the n signal lines 30 according to the associated logical combination.

In one or more embodiments, the device 10 includes a computer interface or other configuration interface, through which it receives zone configuration/selection information, which it stores in memory 18, or elsewhere. In the same or other embodiments, the device 10 provides interface and control logic permitting it to be configured in situ. In any case, the device 10 advantageously recognizes combinatorial zone selection patterns, such that the number N of individual monitoring zones that can be selected by appropriate assertion of r of n zone select input signals is given by $$N = \frac{n!}{r!(n-r)!}.$$

As a non-limiting example, the device 10 comprises a laser scanner configured to detect objects within a scanned area (monitored area) based on emitting laser or other light pulses and detecting their return reflections. Distance detection is based, for example, on time-of-flight measurement principles, and angular detection is based on, for example, detecting the instantaneous scan angle of a rotating laser emitter. In other embodiments, the device 10 includes a camera or other imaging system for area monitoring.

Of course, the advantageous zone selection teachings provided herein further apply to ultrasonic, thermal, and other types of monitoring devices. As such, the advantageous zone selection teachings presented herein are not limited to a particular implementation of monitoring device.

Broadly, the teachings herein provide for an area monitoring device that comprises a set of discrete zone selection inputs—i.e., some defined number of zone selection inputs—that are configured to receive zone selection input signals, and a detection system that is configured to monitor an activated one of two or more configured monitoring zones. Each monitoring zone is associated with a different combinatorial zone selection pattern of asserted zone selection input signals, and the area monitoring device further includes a control circuit configured to monitor the discrete zone selection inputs and activate a given one of the configured monitoring zones based on recognizing the associated combinatorial zone selection pattern of asserted zone selection signals.

In at least one embodiment, the number of combinatorial zone selection patterns recognizable by the control circuit is given by the binomial coefficient $$\binom{n}{r} = \frac{n!}{r!(n-r)!},$$

where ! represents the factorial operator, n represents the number of zone selection inputs in the set of discrete zone selection inputs that are configured for use in zone selection, and r represents the number of zone selection input signals that are simultaneously asserted to indicate a desired zone selection combination, where r is less than or equal to n. Further, in at least one such embodiment, there are m zone selection inputs in the set of discrete zone selection inputs, and the control circuit is configured to use a configurable value as the number n of zone selection inputs that are configured for use in zone selection. Still further, in at least one such embodiment, for the case where n is less than m, the control circuit is configured to monitor the m-n unused zone selection inputs for fault conditions or unexpected input signal activity.

In at least one embodiment, the area monitoring device further comprises a configuration interface, wherein the area monitoring device is configured to receive zone configuration and selection information through the configuration interface, for configuring monitoring zones and their associated combinatorial zone selection patterns. Correspondingly, one or more such embodiments of the area monitoring device include a memory configured to store the zone configuration and selection information. Additionally, or alternatively, in one or more embodiments, the area monitoring device further comprises interface and control logic configured to permit in situ configuration of monitoring zones and their associated combinatorial zone selection patterns.

Regardless, in one or more embodiments, the control circuit of the area monitoring device is configured to dynamically change the configured monitoring zone that is activated for monitoring by the detection system in response to recognizing dynamically changing combinatorial zone selection patterns in the zone selection input signals applied to the zone selection inputs.

Further, in at least one embodiment, the area monitoring device comprises an optoelectronic monitoring system, such as a laser scanner or an imaging device, such as a camera or pixel-based system. In any case, in one or more embodiments, the area monitoring device comprises part of an autonomous guided vehicle system, and in one or more other embodiments, the area monitoring device comprises part of a machine guarding safety system.

Figure 3:
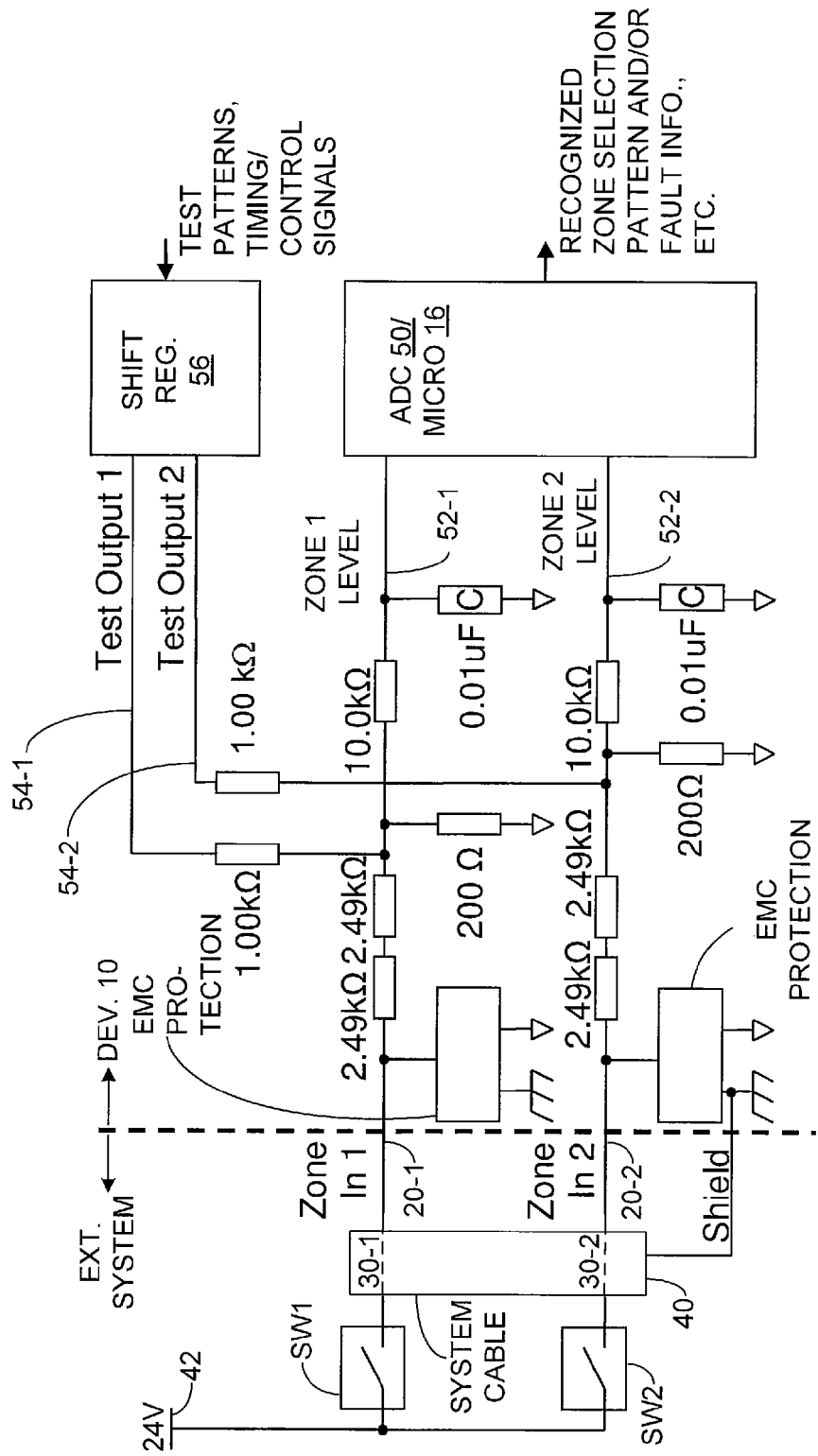
FIG. 3 is a schematic diagram of one embodiment of an area monitoring device that implements a monitoring zone selection method and apparatus as taught herein.

Given the safety criticality of such applications, FIG. 3 illustrates a non-limiting example connection concept for the zone select interface as implemented in the device 10. For simplicity this diagram depicts an external system—e.g., an AGV or machine guarding system that generates the zone selection input signals—to the left of the dashed vertical line, and depicts the device 10 to the right of the dashed vertical line. Further, the zone selection input signal interface circuit 22 is not numbered in the diagram, but rather is depicted by way of example as distributed protection and resistor/capacitor input networks. Still further, for simplicity, only two zone selection input signals 30-1 and 30-2 in a system cable 40 are shown, respectively coupled to the two zone selection inputs 20-1 and 20-2. Any number of zone selection input signals 30 may be used, and the device 10 will have a corresponding (or greater number) of zone selection inputs 20.

Here, the external system includes or is associated with a 24V supply—labeled as supply 42—and it can switch individual ones of the input signals 30-1 and 30-2 into connection with the supply 42 using switches SW1 and SW2. With this arrangement, the input signals 30-1 and 30-2 are either high or low, depending on the state of the switches. The uP 16 (denoted as "MICRO" in the figure) determines whether the zone selection input signal 30-1 is logically asserted or de-asserted by measuring the voltage present on the zone selection input 20-1, and does likewise for the zone selection input signal 30-2, which is applied to the zone selection input 20-2.

In the illustration, the uP 16 includes or is associated with a analog-to-digital converter (ADC) 50, with which it measures zone selection input signal voltages. In particular, the uP 16 measures the voltage present at ADC input 52-1 as an indication of whether the zone selection input signal 30-1 is asserted or de-asserted. Likewise, the uP 16 measures the voltage present at node 52-2 as an indicator of whether the zone selection signal 30-2 is asserted or de-asserted. More broadly, given a desired number of zone selection input signals 30 coupled to respective ones in the set of zone selection inputs 20 provided by the device 10, the uP 16 uses the ADC 50 to sense voltages at corresponding ADC inputs 52, as a mechanism to recognize the combinatorial zone selection pattern represented by the applied zone selection input signals 30.

For safety, however, the device 10 verifies its ability to accurately sense the logical states of individual zone selection input signals, and it uses test outputs 54—e.g., signals 54-1, 54-2, etc.—from a shift register 56 for this purpose. During "normal" operations of the device 10, the test outputs 54 are zero (0V), and the voltages seen on the ADC input lines 52 labeled Zone 1 Level and Zone 2 Level are therefore controlled by the corresponding, applied zone selection input signals 30-1 and 30-2. That is, assuming that the test outputs 54-1 and 54-2 of the shift register 56 are at 0V, the voltage on the ADC input 52-1 is determined by the state of the zone selection input signal 30-1, and the same is true for the ADC input 52-2, with respect to the zone selection input signal 30-2.

Specifically, for the illustrated embodiment, if SW1 is open, the ADC input 52-1 is at 0V, and, if SW1 is closed, the 24V applied to the zone selection input 20-1 is divided down so that a desired, non-zero voltage appears on the ADC input 52-1. (The same applies to the ADC input 52-2, with respect to operation of SW2.) With this approach, then, an external system causes a logic high (asserted) or a logic low (de-asserted) state to be sensed by the device 10 on its zone selection input 20-1, based on closing or opening the switch SW1—which may be a relay, for example. Closing or opening the switch SW2 likewise determines whether the device 10 senses a high or low condition on the zone selection input 20-2. (Of course, those skilled in the art will recognize that the opposite, negative logic can be used as well, where the low state is taken as the asserted condition.)

During "testing" mode operations, however, the device 10 causes the shift register 56 to output logic high values on test outputs 54 according to a desired timing and pattern, and it checks to see that the timing/pattern of voltages on the ADC inputs 52 correctly reflect the known test outputs from the shift register 56. In the illustrated embodiment, for example, the device 10 uses the shift register 56 to activate each test output 54-1 and 54-2 individually. During the individual activation of each such test output, the uP 16 measures all ADC inputs 52, to verify that the offset (voltage) introduced by the active test output is only detected on the corresponding ADC input. Advantageously, a logic high output on any individual test output 54 from the shift register 56 raises the voltage on the corresponding ADC input 52, regardless of whether the zone selection input signal 30 corresponding to that ADC input is asserted or de-asserted. That is, the offsets introduced by the test outputs can be sensed by the uP 16 via the ADC 50, independent of the states of the external zone selection input signals 30. This allows for reliable detection of shorts and opens at the integrated-circuit level within the device 10, e.g., at the uP/ADC.

In another aspect of safety-critical operation, when the external system switches zones—i.e., when it changes from one zone selection pattern to another zone selection pattern—it is expected that the multiple zone selection inputs 20 will not switch simultaneously. Further, to allow for periods of invalidity during a switch, the user shall be able to configure a delay time associated with changing of zones. This delay implies two things for the user. First, all zone selection inputs 20 need to switch within the configured time. Second, once all inputs have reached their desired new state, this configured time must elapse before the device 10 can guarantee the new zone is being monitored. Thus, in one or more embodiments, the device 10 includes timing circuitry—e.g., hardware and/or software timers—that it uses to time the changeover from one zone selection pattern to another. The user can configure this changeover time to suit the characteristics of the application at hand, and the device 10 can be configured to declare a fault if zone selection pattern changes take longer than the configured amount of time.

A further aspect of safe operation of zone selection as presented herein is based on the expectation that valid zone selection combinations (patterns) are presented on the zone selection inputs 20. Assuming no short-circuit failures, this mitigation alone is sufficient to detect open circuit failures anywhere in the zone selection signal paths within the device 10. That is, an open-circuit that results in an invalid zone selection pattern being sensed by the device 10 will trigger a fault or other desired response.

As for mitigating short-circuit failures, the zone selection interface is decomposed into two sections. At the external cable and connector associated with applying the zone selection input signals 30 to the device 10, short-circuits are mitigated using prevention mechanisms. At the ADC 50 within the device, shorts generally cannot be prevented in a practical sense, so an additional detection mitigation is used to focus on the short-circuit failures that could occur at the integrated circuit level. As such, test signal injection is used, such as with the shift register 56 described above. With test signal injection, proper operation of the ADC 50 is verified by injecting, for example, minimum and maximum levels on ADC inputs 52, where such ADC inputs 52 are used to monitor the individual zone selection inputs 20/zone selection input signals 30.

Of course, those skilled in the art will appreciate that the present invention is not limited by the foregoing discussion of example embodiments, or by the accompanying drawings. Rather, the present invention is limited only by the following appended claims, and their legal equivalents.

What is claimed is:

1. An area monitoring device comprising:
a set of discrete zone selection inputs configured to receive zone selection input signals;
a detection system configured to monitor an activated one of two or more configured monitoring zones, each monitoring zone associated with a different combinatorial zone selection pattern of asserted zone selection input signals;
a control circuit configured to monitor the discrete zone selection inputs and activate a given one of the configured monitoring zones based on recognizing the associated combinatorial zone selection pattern of asserted zone selection signals.

2. The area monitoring device of claim 1, wherein the number of combinatorial zone selection patterns recognizable by the control circuit is given by the binomial coefficient $$\binom{n}{r} = \frac{n!}{r!(n-r)!},$$

where ! represents the factorial operator, n represents the number of zone selection inputs in the set of discrete zone selection inputs that are configured for use in zone selection, and r represents the number of zone selection input signals that are simultaneously asserted to indicate a desired zone selection combination, where r is less than or equal to n.

3. The area monitoring device of claim 2, wherein there are m zone selection inputs in the set of discrete zone selection inputs, and wherein the control circuit is configured to use a configurable value as the number n of zone selection inputs that are configured for use in zone selection.

4. The area monitoring device of claim 1, wherein the area monitoring device further comprises a configuration interface, and wherein the area monitoring device is configured to receive zone configuration and selection information through the configuration interface, for configuring monitoring zones and their associated combinatorial zone selection patterns.

5. The area monitoring device of claim 4, further comprising a memory configured to store the zone configuration and selection information.

6. The area monitoring device of claim 1, wherein the area monitoring device further comprises interface and control logic configured to permit in situ configuration of monitoring zones and their associated combinatorial zone selection patterns.

7. The area monitoring device of claim 1, wherein the control circuit is configured to dynamically change the configured monitoring zone that is activated for monitoring by the detection system in response to recognizing dynamically changing combinatorial zone selection patterns in the zone selection input signals applied to the zone selection inputs.

8. The area monitoring device of claim 1, wherein the control circuit is configured to operate with a configured delay time that establishes a time within which the zone selection inputs must switch states from one valid combinatorial zone selection pattern to another valid combinatorial zone selection pattern.

9. The area monitoring device of claim 1, wherein the area monitoring device comprises an optoelectronic monitoring system.

10. The area monitoring device of claim 9, wherein the optoelectronic monitoring system comprises a laser scanner.

11. The area monitoring device of claim 9, wherein the optoelectronic monitoring system comprises an imaging device.

12. The area monitoring device of claim 1, wherein the area monitoring device comprises part of an autonomous guided vehicle system.

13. A method in an area monitoring device of activating different monitoring zones for monitoring by the area monitoring device, the method comprising:
    monitoring zone selection input signals applied to zone selection inputs of the area monitoring device;
    associating each of two or more configured monitoring zones with a different combinatorial zone selection pattern of asserted zone selection input signals;
    activating a given one of the configured monitoring zones based on recognizing that a combinatorial pattern of asserted ones of the zone selection input signals matches the associated combinatorial zone selection pattern.

14. The method of claim 13, wherein the number of recognizable combinatorial zone selection patterns is given by the binomial coefficient $$\binom{n}{r} = \frac{n!}{r!(n-r)!},$$

where ! represents the factorial operator, n represents the number of zone selection inputs that are configured for use in zone selection, and r represents the number of zone selection input signals that are simultaneously asserted to indicate a desired zone selection combination, where r is less than or equal to n.

15. The method of claim 14, further comprising configuring r to be less than or equal to n−1.

16. The method of claim 14, further comprising using a configurable value as the number n of m zone selection inputs that are configured for use in zone selection.

17. The method of claim 13, further comprising configuring monitoring zones and their associated combinatorial zone selection patterns based on receiving zone configuration and selection information from an external computer system.

18. The method of claim 17, further comprising storing the zone configuration and selection information in a memory of the area monitoring device.

19. The method of claim 13, further comprising configuring monitoring zones and their associated combinatorial zone selection patterns based on receiving zone configuration and selection information based on input received through an interface of the area monitoring device.

20. The method of claim 13, further comprising dynamically changing the configured monitoring zone that is activated for monitoring by the area monitoring device in response to recognizing dynamically changing combinatorial zone selection patterns in the zone selection input signals applied to the zone selection inputs.

* * * * *